(12) United States Patent
Cutu et al.

(10) Patent No.: US 10,510,149 B2
(45) Date of Patent: Dec. 17, 2019

(54) GENERATING A DISTANCE MAP BASED ON CAPTURED IMAGES OF A SCENE

(71) Applicant: AMS SENSORS SINGAPORE PTE. LTD., Singapore (SG)

(72) Inventors: Florin Cutu, San Jose, CA (US); Alireza Yasan, San Jose, CA (US); Xin Liu, Sunnyvale, CA (US)

(73) Assignee: AMS SENSORS SINGAPORE PTE. LTD, Singapore (SG)

( * ) Notice: Subject to any disclaimer, the term of this patent is extended or adjusted under 35 U.S.C. 154(b) by 0 days.

(21) Appl. No.: 15/743,948

(22) PCT Filed: Jul. 8, 2016

(86) PCT No.: PCT/SG2016/050320
§ 371 (c)(1),
(2) Date: Jan. 11, 2018

(87) PCT Pub. No.: WO2017/014691
PCT Pub. Date: Jan. 26, 2017

(65) Prior Publication Data
US 2018/0204329 A1    Jul. 19, 2018

Related U.S. Application Data

(60) Provisional application No. 62/193,877, filed on Jul. 17, 2015.

(51) Int. Cl.
*G06T 7/174*         (2017.01)
*G06T 5/00*          (2006.01)
(Continued)

(52) U.S. Cl.
CPC .............. *G06T 7/174* (2017.01); *G06T 5/001* (2013.01); *G06T 5/007* (2013.01); *G06T 5/50* (2013.01);
(Continued)

(58) Field of Classification Search
CPC ........... G06T 7/593; G06T 2207/10012; G06T 2207/10021; H04N 13/271; H04N 2013/0081
See application file for complete search history.

(56) References Cited

U.S. PATENT DOCUMENTS 6,873,723 B1    3/2005 Aucsmith et al.
7,505,623 B2    3/2009 Jones et al.
(Continued)

FOREIGN PATENT DOCUMENTS

EP    2309452    4/2011
EP    2509324    10/2012

OTHER PUBLICATIONS

Dhond, U.R. et al., "Structure from Stereo-A Review," IEEE Transactions on Systems, Man, and Cybernetics, Nov./Dec. 1989, vol. 19(6):1489-1510.
(Continued)

*Primary Examiner* — Ross Varndell
(74) *Attorney, Agent, or Firm* — Michael Best & Friedrich LLP

(57) ABSTRACT

Techniques are described for generating a distance map (e.g., a map of disparity, depth or other distance values) for image elements (e.g., pixels) of an image capture device. The distance map is generated based on an initial distance map (obtained, e.g., using a block or code matching algorithm) and a segmentation map (obtained using a segmentation algorithm). In some instances, the resulting distance map can be less sparse than the initial distance map, can contain more accurate distance values, and can be sufficiently fast for real-time or near real-time applications. The resulting distance map can be converted, for example, to a color-coded distance map of a scene that is presented on a display device.

11 Claims, 9 Drawing Sheets

(51) Int. Cl.
  *G06T 5/50* (2006.01)
  *G06T 7/593* (2017.01)
  *G06T 7/90* (2017.01)
  *G06T 7/557* (2017.01)

(52) U.S. Cl.
  CPC .............. *G06T 7/557* (2017.01); *G06T 7/593* (2017.01); *G06T 7/90* (2017.01); *G06T 2200/04* (2013.01); *G06T 2207/10024* (2013.01); *G06T 2207/10028* (2013.01); *G06T 2207/10048* (2013.01); *G06T 2207/20216* (2013.01)

(56) References Cited

U.S. PATENT DOCUMENTS

| | | | |
|---|---|---|---|
| 2004/0240725 | A1 | 12/2004 | Xu et al. |
| 2006/0056727 | A1 | 3/2006 | Jones et al. |
| 2008/0260288 | A1 | 10/2008 | Redert |
| 2010/0208994 | A1* | 8/2010 | Yao .......................... G06T 5/005 382/173 |
| 2011/0001799 | A1 | 1/2011 | Rothenberger et al. |
| 2011/0025827 | A1 | 2/2011 | Shpunt et al. |
| 2012/0207388 | A1 | 8/2012 | El Dokor et al. |
| 2013/0071008 | A1 | 3/2013 | Chen et al. |
| 2013/0100256 | A1 | 4/2013 | Kirk et al. |
| 2013/0129194 | A1 | 5/2013 | Gusis et al. |
| 2013/0136299 | A1 | 5/2013 | Kim et al. |
| 2013/0155050 | A1 | 6/2013 | Rastogi et al. |
| 2014/0192158 | A1* | 7/2014 | Whyte ................. G06K 9/6201 348/46 |
| 2014/0241612 | A1* | 8/2014 | Rhemann ................ G06T 7/521 382/154 |
| 2014/0307057 | A1 | 10/2014 | Kang et al. |
| 2014/0375775 | A1 | 12/2014 | Yeatman, Jr. et al. |
| 2015/0138185 | A1 | 5/2015 | Huang et al. |
| 2015/0170370 | A1 | 6/2015 | Ukil et al. |
| 2017/0127046 | A1* | 5/2017 | Das .......................... G06T 5/002 |

OTHER PUBLICATIONS

Henry, P. et al., "RGB-D mapping: Using Kinect-style depth cameras for dense 3D modeling of indoor environments," The International Journal of Robotics Research 31(5) 2012, pp. 647-663.

Ohm, J. et al., "A realtime hardware system for stereoscopic videoconferencing with viewpoint adaptation," International Workshop on Synthetic-Natural Hybrid Coding and Three Dimensional Imaging (IWSNHC3DI'97), 1997.

Somanath, G. et al., "Sterio+Kinect for High Resolution Stereo Correspondences", 2013 International Conference on 3D Vision, Jun. 29-Jul. 1, 2013, pp. 9-16.

Yong, D. et al., "A Real-Time System for 3D Recovery of Dynamic Scene with multiple RGBD Imagers," IEEE Computer Society conference on Computer Vision and pattern Recognition Workshops (CVPRW), Jun. 20-25, 2011, pp. 1-8, IEEE.

International Search Report of ISA/AU for PCT/SG2016/050320 (dated Sep. 29, 2016).

E. Olson et al., "An Introduction to Stereo Vision and Disparity Computation," 3 pages (downloaded from Internet, May 7, 2015).

J/ Salvi et al., "Pattern codification strategies in structured light systems," 18 pages (downloaded from Internet, May 7, 2015).

* cited by examiner

GENERATING A DISTANCE MAP BASED ON CAPTURED IMAGES OF A SCENE

CROSS-REFERENCE TO RELATED APPLICATION(S)

The present application claims the benefit of priority of U.S. Provisional Patent Application No. 62/193,877, filed on Aug. 3, 2015, the contents of which are incorporated herein by reference in their entirety.

TECHNICAL FIELD

This disclosure relates to image processing and, in particular, to systems and techniques for generating a distance map based on captured images of a scene.

BACKGROUND

Various image processing techniques are available to find depths of a scene in an environment using image capture devices. The depth data may be used, for example, to control augmented reality, robotics, natural user interface technology, gaming and other applications.

Stereo matching is a process in which two images (a stereo image pair) of a scene taken from slightly different viewpoints are matched to find disparities (differences in position) of image elements which depict the same scene element. The disparities provide information about the relative distance of the scene elements from the camera. Stereo matching enables distances (e.g., depths of surfaces of objects of a scene) to be determined. A stereo camera including, for example, two image capture devices separated from one another by a known distance can be used to capture the stereo image pair. In some imaging systems, the scene is illuminated with a structured pattern, for example, of dots, lines or other pattern.

In general, there is a trade-off between accuracy of results and the speed and resources needed to make the depth or distance calculations. Thus, for example, in some cases, one or more pixels in the image capture devices may be assigned incorrect disparity values. Further, in some instances, many pixels may not be assigned a disparity value at all, such that the resulting disparity map (or subsequently computed distance map) is sparsely populated. A sparse disparity map can result, for example, from a low-textured scene or a sparse projected light pattern. Although global optimization algorithms and other algorithms can produce full disparity maps and can alleviate the foregoing problems, they tend to require more computational resources (e.g., they are generally slower and consume more power). Since these algorithms require more computational resources (e.g., computational time) these techniques are, therefore, less suited for real-time (e.g., about 30 frames per second) or near real-time (e.g., about 5 frames per second) applications.

SUMMARY

The present disclosure describes techniques for generating a distance map (e.g., a map of disparity, depth or other distance values) for image elements (e.g., pixels) of an image capture device. The distance map is generated based on an initial distance map (obtained, e.g., using a block or code matching algorithm or time-of-flight techniques) and a segmentation map (obtained using a segmentation algorithm). In some instances, the resulting distance map can be less sparse than the initial distance map, can contain more accurate distance values, and can be sufficiently fast for real-time or near real-time applications. In some applications, the resulting distance map can be converted to a visual distance map of a scene that is presented on a display device. For example, the updated distance map can be graphically displayed such that different distance values are indicated by different, colors, cross-hatchings or other visual indicators. The disparity map can be used in other applications as well, including distance determinations or gesture recognition. For example, the resulting distance map can be advantageously used in conjunction with image recognition to provide an alert to the driver of a vehicle, or to decelerate the vehicle so as to avoid a collision.

In one aspect, a method of providing a distance map of a scene is described. The method includes acquiring images of the scene using one or more image capture devices and generating a distance map, based on the acquired images, wherein a respective initial distance value is assigned for at least some individual image elements. Also, a segmentation algorithm is applied to at least one of the acquired images to generate a segmentation map in which image elements are divided into a plurality of segments. A respective distance value is assigned to each of the segments, wherein the distance value assigned to each particular segment is derived based on the initial distance values assigned to individual image elements associated with the particular segment. The method also includes assigning to each of the image elements a respective updated distance value, wherein the updated distance value assigned to each particular image element is the same as the distance value assigned to the particular segment of which the particular image element is a part.

Some implementations include displaying, on a display device, a distance map of the scene, wherein the distance map indicates the respective updated distance values for the image elements. The updated distance map can be graphically displayed such that different distance values are indicated by different, colors, cross-hatchings or other visual indicators. For example, a color-coded version of the updated distance map of the scene can be displayed, wherein each color represents a different respective distance to facilitate visual viewing of the distance map.

Some implementations include one or more of the following features. For example, generating the distance map can include applying a matching algorithm to the acquired images. The matching algorithm may use, for example, stereo matching, block matching, or code-word matching. In some instances, the matching algorithm includes computing disparity information from multiple acquired stereo images of the scene.

In some cases, computing disparity information includes computing a distance in image elements between a location of a feature in a first one of the stereo images and a location of a same or substantially same feature in a second one of the stereo images. The second stereo image can be searched to identify a closest match for a small region in the first stereo image. In some implementations, a sum of absolute differences technique is used to identify the closest match.

In accordance with some implementations, the segmentation algorithm identifies regions of an image, where image elements in each respective region have the same or similar color or grey-scale value and wherein each region identified by the segmentation algorithm defines a contiguous group of image elements. The segmentation algorithm, in some cases, generates a segmentation map in which each particular image element is assigned a segment label based on the segment that it is associated with the particular image element.

Assigning a respective distance value to each particular one of the segments can include assigning a respective average value to each particular segment, wherein the average value for each particular segment is an average of most or all of the initial distance values assigned to individual image elements associated with the particular segment.

The present disclosure also describes an apparatus for generating a distance map of a scene. The apparatus includes one or more image capture devices to acquire images of the scene. A first engine is configured to generate a distance map in which a respective initial distance value is assigned for at least some individual image elements. A segmentation engine is configured to apply a segmentation algorithm to at least one of the acquired images and to generate a segmentation map in which image elements are divided into a plurality of segments. A distance value assignment engine is configured to assign a respective distance value to each of the segments, wherein the distance value assigned to each particular segment is derived based on the initial distance values assigned to individual image elements associated with the particular segment. The distance value assignment engine further is configured to assign to each of the image elements a respective updated distance value. The updated distance value assigned to each particular image element is the same as the distance value assigned to the particular segment of which the particular image element is a part. The apparatus also can include, in some instances, a display device configured to display a distance map of the scene, wherein the distance map indicates the respective updated distance values for the image elements. The various engines can be implemented, for example, in hardware (e.g., one or more processors or other circuitry) and/or software.

Various implementations can provide one or more of the following advantages. For example, the subject matter can help reduce sparseness of the distance map and can help correct for inaccuracies that sometimes arise in the distance data. Such techniques can be helpful, for example, even where the scene being imaged has low texture or where the projected light pattern is relatively sparse. Importantly, the present techniques can, in some cases, increase the overall computation speed, thereby reducing the time needed to generate a distance map having low sparseness. The techniques described here, therefore, can be applied in real-time or near-real time applications.

Other aspects, features and advantages will be readily apparent from the following detailed description, the accompanying drawings and the claims.

DETAILED DESCRIPTION

The present disclosure describes techniques for generating a distance map (e.g., a map of disparity, depth or other distance values) for image elements (e.g., pixels) in an image capture device. The distance map is generated based on an initial distance map (obtained, e.g., using a block or code matching algorithm) and a segmentation map (obtained using a segmentation algorithm). The resulting distance map, in some instances, can be less sparse than the initial distance map, can contain more accurate distance values, and can be sufficiently fast for real-time or near real-time applications. In some applications, the resulting distance map is used to display a color-coded distance map of an image of a scene.

Figure 1:
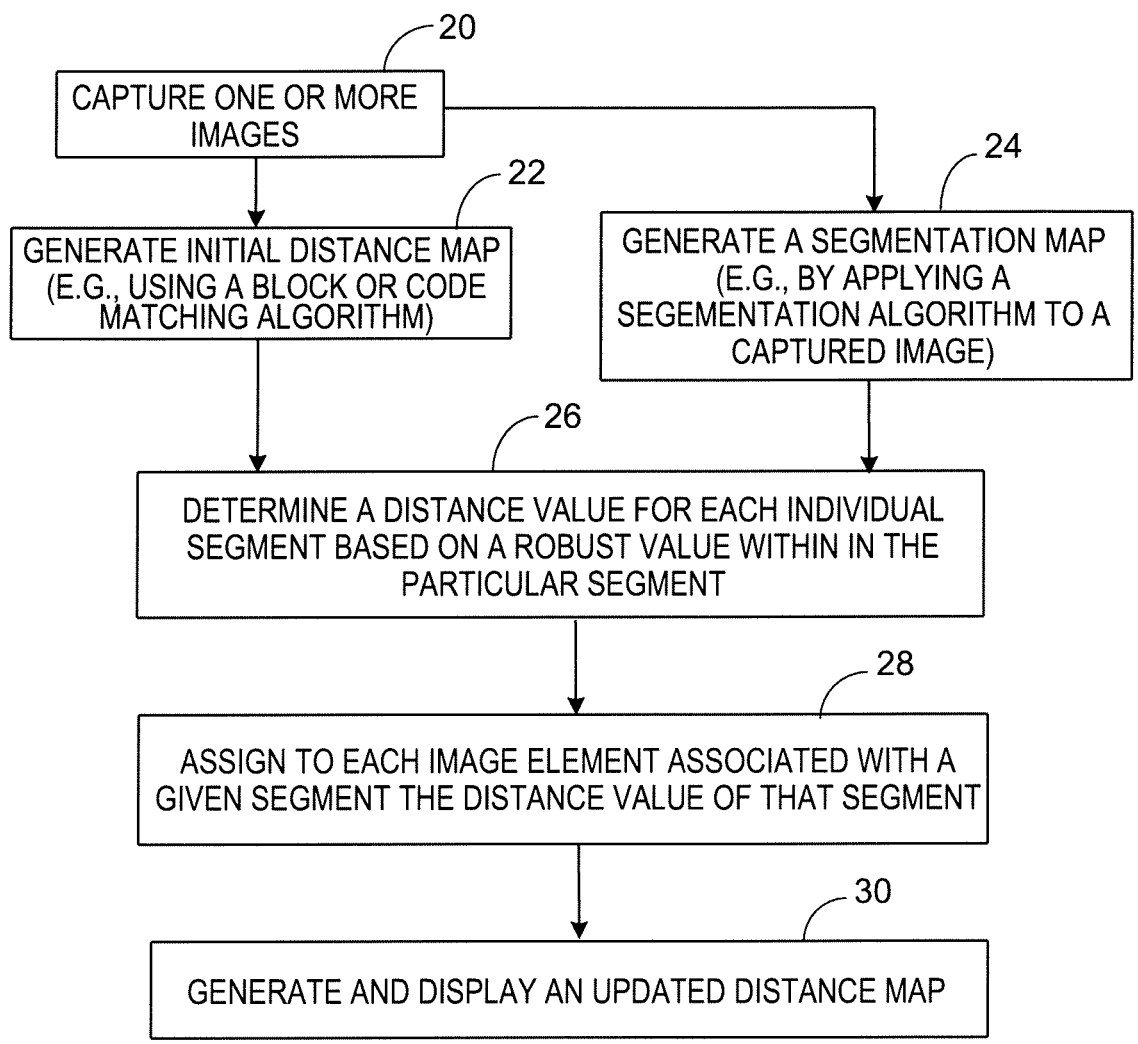
FIG. 1 is a flow chart of a method for generating a distance map using acquired images

FIG. 1 illustrates a flow chart of a process for generating a distance map (a map of distance data). Distance data (e.g., data derived from disparity data) is obtained using one or more image capturing devices (block 20). The distance data can be obtained using, for example, stereo techniques, in which the distance to points in the scene are determined via known techniques. In other implementations, the distance data can be obtained using time of flight (TOF) techniques, triangulation techniques, and/or structured light techniques. For example, in structured light techniques, the scene is illuminated with a specially designed light pattern.

Whichever technique is used, an initial distance map (e.g., a disparity, depth or other distance map) is generated using the distance data (block 22). Examples of algorithms for generating the distance data from disparity data include block matching or other stereo matching algorithms. Stereovision is based on imaging a scene from two or more points of view and then finding correspondences between the different images to triangulate the 3D position. Other examples of algorithms for generating the distance data include code-word matching algorithms. For example, structured light techniques are based on projection of one or more light patterns onto a scene that is imaged by one or more imaging devices. In coded structured light systems, the illumination patterns are designed so that code-words are assigned to a set of image elements (e.g., pixels) in the imaging device.

An example of block matching is described in the following paragraph. However, depending on the implementation, other types of matching algorithms (e.g., other stereo matching or code-word matching algorithms) may be used as well.

In some block matching algorithms, disparity information is computed from a pair of stereo images of a scene by computing the distance in pixels between the location of a feature in one image and the location of the same or substantially same feature in the other image. Thus, the second image is searched to identify the closest match for a small region (i.e., block of pixels) in the first image.

Various techniques can be used to determine how similar regions in the two images are, and to identify the closest match. One such known technique is the "sum of absolute differences," sometime referred to as "SAD." To compute the sum of absolute differences between a template and a block, a grey-scale value for each pixel in the template is subtracted from the grey-scale value of the corresponding pixel in the block, and the absolute value of the differences is calculated. Then, all the differences are summed to provide a single value that roughly measures the similarity between the two image regions. A lower value indicates the patches are more similar. To find the block that is "most similar" to the template, the SAD values between the template and each block in the search region is computed, and the block with the lowest SAD value is selected. The disparity refers to the distance between the centers of the matching regions in the two images. In a disparity map, pixels with larger disparities are closer to the camera, and pixels with smaller disparities are farther from the camera.

As noted above, in other implementations, different matching techniques may be used to generate the initial distance map. For example, for systems in which the scene is illuminated with structured light, a code-word matching algorithm can be used to generate the distance map.

As further shown in FIG. 1, a segmentation algorithm is applied to an image of the scene captured by the same or another image capturing device to generate a segmentation map (block 24). The captured image may be stored, for example, using a RGB or grey scale. A segmentation algorithm identifies regions within the image, where image elements (e.g., pixels) in each respective region (i.e., segment) have the same or similar color or grey-scale value. Each region identified by the segmentation algorithm defines a contiguous/connected group of image elements. The segmentation algorithm generates a segmentation map in which each image element is assigned a segment label based on the segment that it is associated with. Known segmentation algorithms can be used (e.g., the image can be quantized and a connected component algorithm can be applied to the quantized image).

The distance map generated in block 22 and the segmentation map generated in block 24 are used to calculate and assign a distance value (e.g., a disparity, depth or other distance value) to each segment based on the distance values previously calculated for the individual image elements (e.g., pixels) in the particular segment (block 26). For example, an average (e.g., robust average) value for each segment can be calculated based on the distance values previously calculated for the individual image elements in the particular segment. In some instances, outlier distance values (e.g., values lying outside one standard deviation) can be ignored when calculating the average value. In any event, each image element associated with a given segment is assigned the distance value calculated for that segment (block 28). An updated distance map is thus generated in which each individual image element is assigned a respective distance value. Therefore, image elements that were not previously assigned a distance value now have a distance value assigned to them. Further, some image elements may be assigned an updated distance value that differs from the distance value previously initially assigned to them in block 22. In this way, an updated distance map can be generated and displayed, for example, as a three-dimensional color image, where different colors indicate different distances value (block 30). In some implementations, the updated distance map can be graphically displayed such that different distance values are indicated by different cross-hatching or other visual indicators.

In some instances, calibration may be performed, for example, prior to block 26. Calibration can include, for example, determining and applying a transformation between the depth image(s) and the segmentation map.

Figure 2:
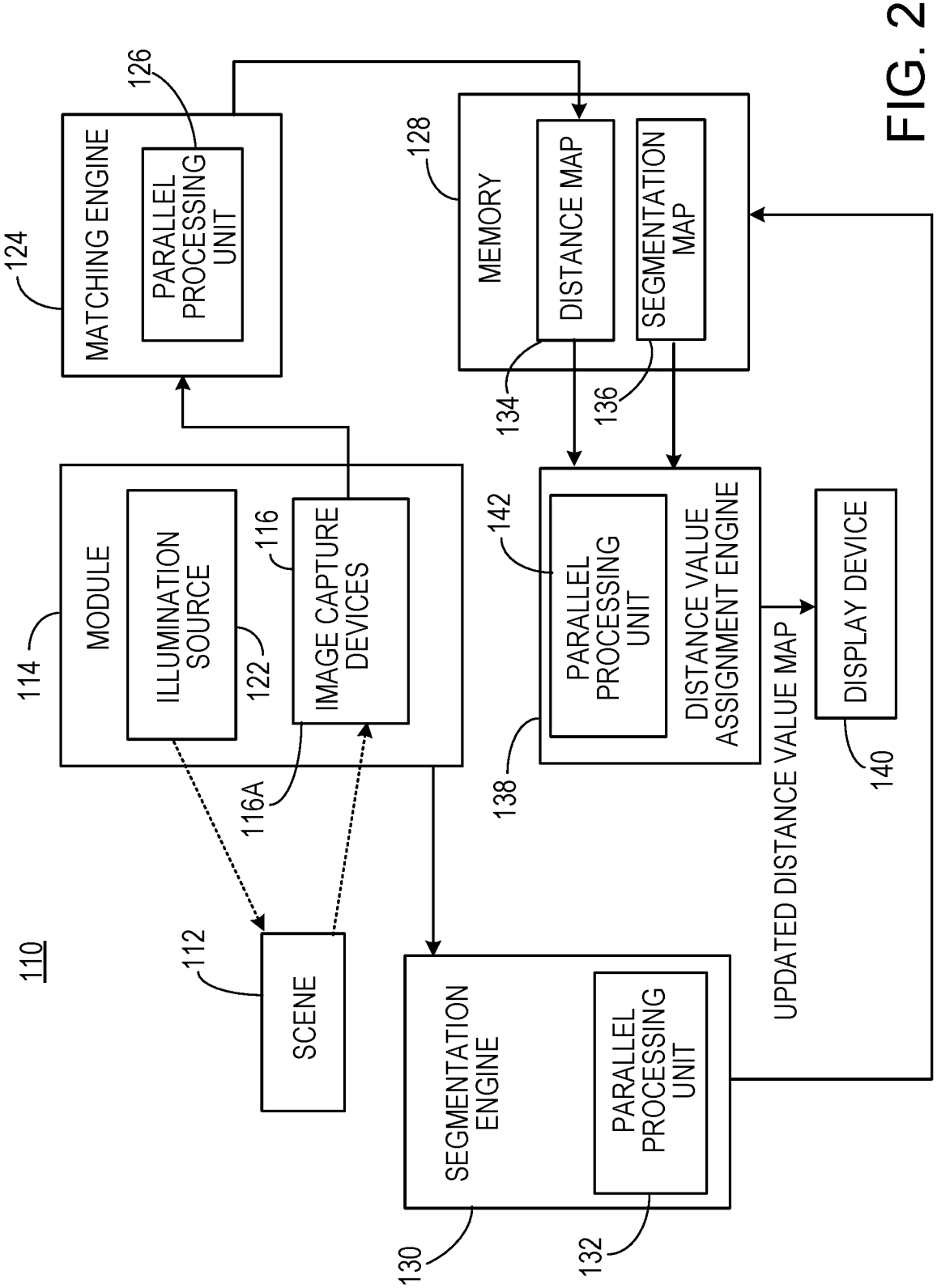
FIG. 2 is an example of a system for generating a distance map using acquired images.

FIG. 2 illustrates an example of a system 110 for generating a distance map (e.g., a map of disparity, depth or other distance values) based on captured images of a scene 112. The system can include an optoelectronic module 114 to capture image data. For example, in some cases, the module 114 has one or more image capture devices 116 (e.g., CMOS image sensors, CCD image sensors, or time of flight (TOF) sensors) to capture images of the scene 112. In some cases, the module 114 also may include an associated illumination source 122 arranged to project a pattern of illumination onto the scene 112. When present, the illumination source 122 can include, for example, an infra-red (IR) projector, a visible light source or some other source operable to project a pattern (e.g., of dots or lines) onto objects in the scene 112.

The illumination source 122 can be implemented, for example, as a light emitting diode (LED), an infra-red (IR) LED, an organic LED (OLED), an infra-red (IR) laser or a vertical cavity surface emitting laser (VCSEL).

In the illustrated example, image data from the image capture devices 116 is provided to a real-time or near real-time matching engine 124, which calculates distance values (e.g., disparity, depth or other distance values) for individual image elements (e.g., pixels) using a block matching, code matching or other matching algorithm. The distance values are related to distances from the image capturing devices to surfaces of the object(s) in the scene 112 represented by the image elements. The matching engine 124 (which may be referred to as the first engine) thus generates a distance map 134 that can be stored in memory 128. The matching engine 124 may generate distance values for fewer than all the image elements. Thus, some image elements may not have a distance value associated with them at this stage. The matching engine 124 can be implemented, for example, using a computer and can include a parallel processing unit 126 (e.g., an application specific integrated circuit (ASIC) or a field programmable gate array (FPGA)). In other instances, the matching engine 124 can be implemented in software (e.g., in a processor of the mobile device (e.g., smartphone)).

Image data from the image capture devices 116 also is provided to a real-time image segmentation engine 130, which partitions one of the images of the scene into multiple segments (i.e., groups of image elements). The image segmentation engine 130 can locate objects and boundaries (lines, curves, etc.) in the images and can assign a label to every image element (e.g., pixel) in an image such that image elements with the same label share certain characteristics. The result of image segmentation is a segmented image (i.e., a set of segments that collectively cover the entire image). Each of the image elements in a segment are similar with respect to some characteristic or computed property, such as color, intensity, or texture. Generally, adjacent segments are significantly different with respect to the same characteristic(s). The segmentation engine 130 thus generates a segmentation map 136 that can be stored, for example, in the memory 128. The segmentation engine 130 can be implemented, for example, using a computer and can include a parallel processing unit 132 (e.g., an application specific integrated circuit (ASIC) or a field programmable gate array (FPGA)). In other instances, the segmentation engine 130 can be implemented in the processor of the mobile device (e.g., smartphone).

The distance map 134 and segmentation map 136 are provided to a distance value assignment engine 138, which uses the distance map data and the segmentation map data to calculate and assign a distance value (e.g., a disparity, depth or other distance value) to each segment based, at least in part, on the distance values previously calculated for the image elements (e.g., pixels) in the particular segment. For example, as described above, the distance value assignment engine 138 can calculate an average value for each segment based on the distance values previously calculated for the individual image elements in the particular segment. Each image element associated with a given segment is assigned the distance value of that segment. The distance value assignment engine 138 thus generates an updated distance map in which every image element has a respective distance value. Therefore, image elements that were not previously assigned a distance value now have a distance value assigned to them. Further, some image elements may be assigned an updated distance value that differs from the distance value initially assigned to them by the matching engine 124.

The distance value assignment engine 138 also can be implemented, for example, using a computer and can include a parallel processing unit 142 (e.g., an application specific integrated circuit (ASIC) or a field programmable gate array (FPGA)). In other instances, the distance value assignment engine 138 can be implemented in the processor of the mobile device (e.g., smartphone). Although the various engines 124, 130, 138 and memory 128 are shown in FIG. 2 as being separate from the module 114, in some implementations they may be integrated as part of the module 114. For example, the engines 124, 130, 138 and memory 128 may be implemented as one or more integrated circuit chips mounted on a printed circuit board (PCB) within the module 114, along with the image capture devices 116. Further, in some cases, the illumination source 122 may be separate from the module 114 that houses the image capture devices 116. The module 114 also can include other processing and control circuitry to control, for example, the timing of when the illumination source is on or off (i.e., when a pattern is projected) and/or when the image capture devices 116 acquire images. Such circuitry also can be implemented, for example, in one or more integrated circuit chips mounted on the same PCB as the image capture devices 116.

The updated distance map can be provided to a display device (e.g., a monitor or display screen) 140, which presents the updated distance map, for example, as a three-dimensional color image. Different colors can represent different distances values. Thus, in some cases, the three-dimensional image presented on the display device 140 can represent different disparity values, whereas in other cases, the three-dimensional image presented on the display device 140 can represent different depth values.

The following paragraphs illustrate various specific implementations using different modules (e.g., modules having different numbers and/or types of imagers). Some of the modules include an illumination source to project a pattern onto objects in the scene, whereas other modules may not include such an illumination source.

Figure 3:
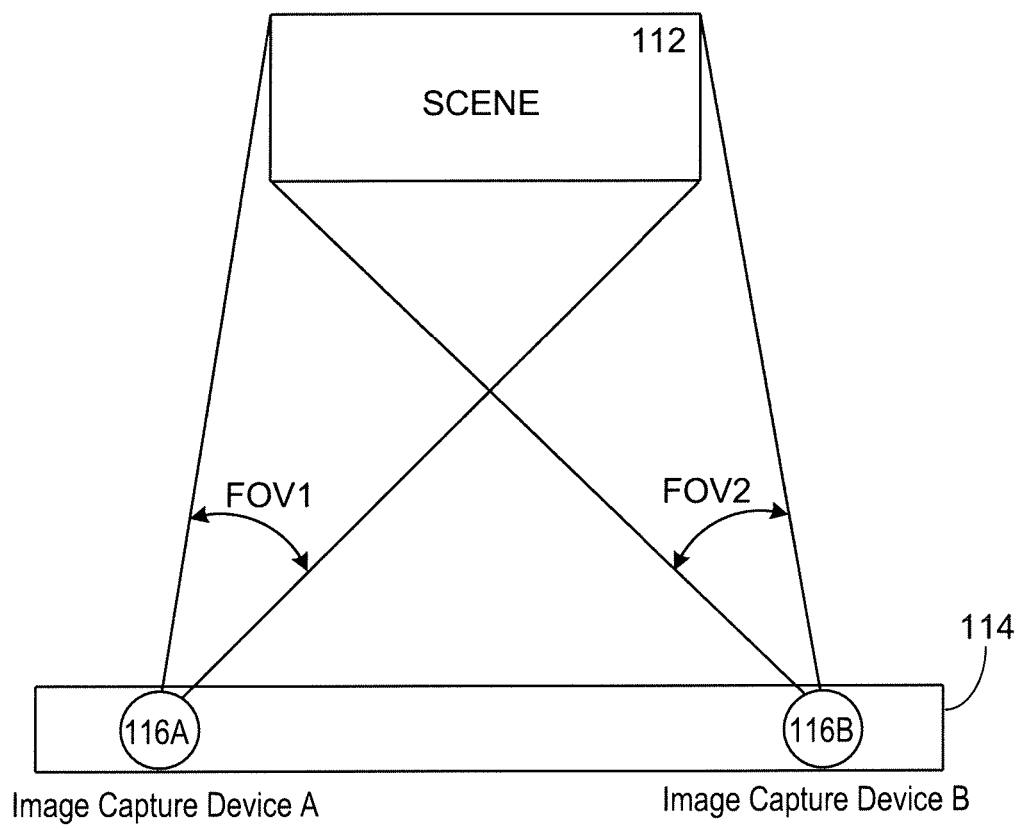
FIGS. 3 through 9 illustrate further details according to various examples of generating distance maps.

For example, FIG. 3 illustrates an example in which the module includes first and second stereo cameras 116A, 116B as the image capture devices. The stereo camera 116A, 116B are separated from one another by a known distance and are arranged so that their respective fields of view (FOV1, FOV2) substantially overlap. The cameras 116A, 116B in this example are sensitive to ambient light (i.e., RGB light in the visible part of the spectrum) and can sense ambient light reflected by the scene 112. In this scenario, images captured by both stereo cameras 116A, 116B are provided to the matching engine 124, which implements a block-matching or other stereo matching algorithm and generates an initial disparity map. An image from at least one of the cameras 116A, 116B is provided to the segmentation engine 130 to generate the segmentation map. For such a stereo-image system, the updated distance value map generated by the engine 138 can take the form of a disparity map indicating the disparity values for the image elements (e.g., pixels).

Figure 4:
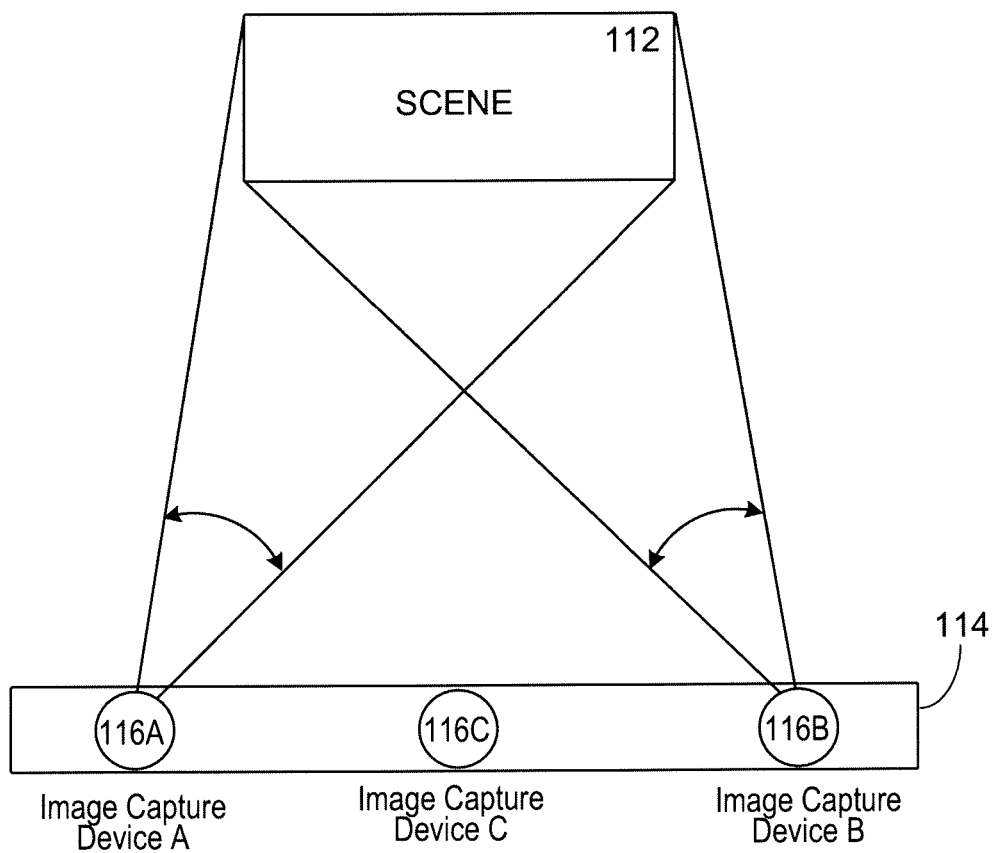

FIG. 4 illustrates an example in which the module includes first and second stereo cameras 116A, 116B, as well as a third image capture device 116C (e.g., a high-resolution image sensor). The stereo cameras 116A, 116B are separated from one another by a known distance and are arranged so that their respective fields of view (FOV1, FOV2) substantially overlap. The cameras 116A, 116B in this example are sensitive to ambient light (i.e., RGB light in the visible part of the spectrum) and can sense ambient light reflected by the scene 112. In this scenario, images captured by both stereo cameras 116A, 116B are provided to the matching engine 124, which implements a block-matching or other stereo matching algorithm and generates an initial disparity map. An image of the scene 112 captured by the third image capture device 116C is provided to the segmentation engine 130, which generated the segmentation map. For such a stereo-image system, the updated distance value map generated by the engine 138 can take the form of a disparity map indicating the disparity values for the image elements (e.g., pixels).

Figure 5:
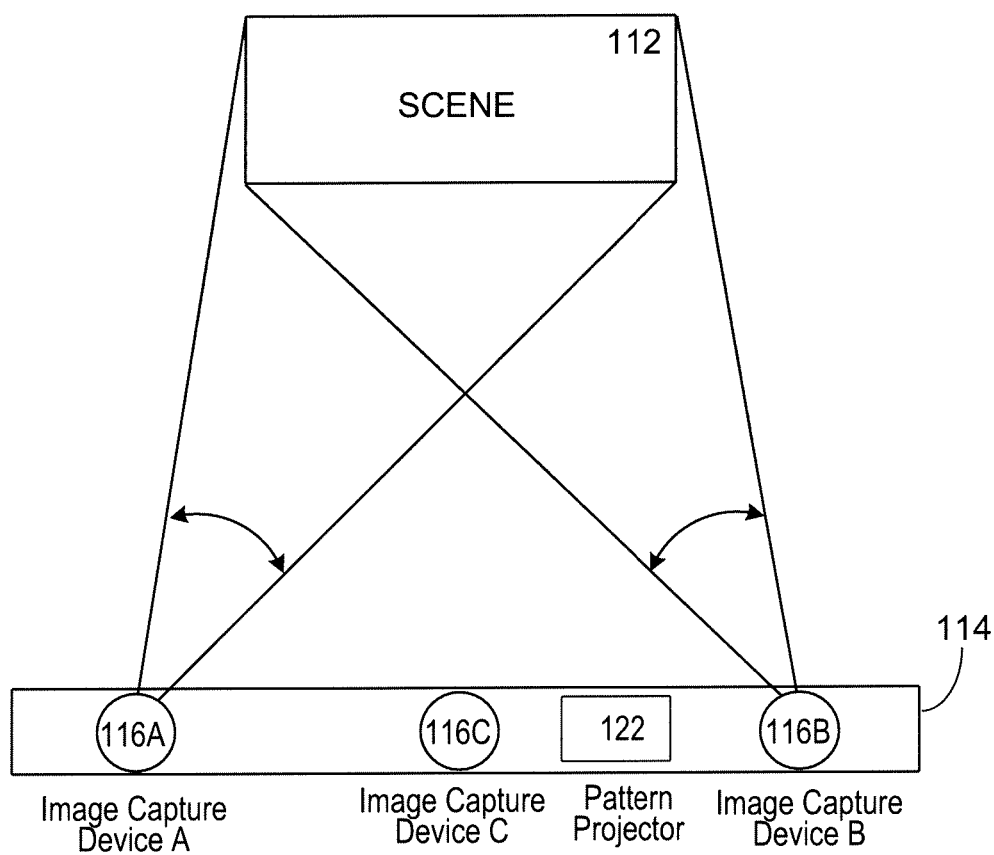

FIG. 5 illustrates an example in which the module includes first and second stereo cameras 116A, 116B, a third image capture device 116C (e.g., a high-resolution image sensor), and a pattern projector 122 that is operable to project an IR pattern onto the scene 112. The stereo cameras 116A, 116B are separated from one another by a known distance and are arranged so that their respective fields of view (FOV1, FOV2) substantially overlap. In this example, the cameras 116A, 116B are sensitive to IR illumination and can sense IR radiation reflected from the scene 112. In this scenario, images captured by the stereo cameras 116A, 116B while the projector 122 is on are provided to the matching engine 124, which implements a block-matching or other stereo matching algorithm and generates an initial disparity map. An image of the scene 112 captured by the third image capture device 116C is provided to the segmentation engine 130, which generates the segmentation map. If the third image capture device 116C also is sensitive to IR radiation, then an image of the scene 112 captured by the third image capture device 116C while the projector 122 is off (i.e., not projecting a pattern onto the scene 112) should be provided to the segmentation engine 130. On the other hand, if the third image capture device 116C is sensitive to ambient light (i.e., light in the visible part of the spectrum), but is not sensitive to the IR radiation generated by the pattern projector 122, then the image provided to the segmentation engine 130 can be captured by the third image capture device 116C even while the projector 122 is on (i.e., projecting a pattern onto to the scene 112). For such a stereo-image system, the updated distance value map generated by the engine 138 can take the form of a disparity map indicating the disparity values for the image elements (e.g., pixels).

Figure 6:
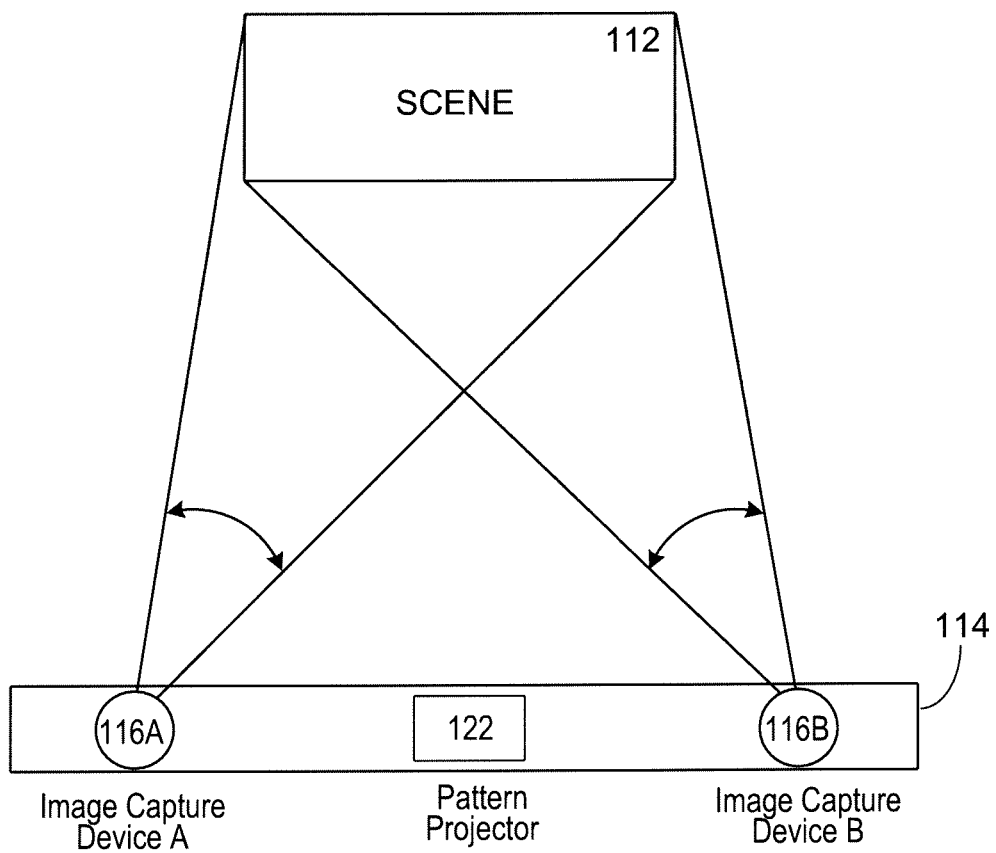

FIG. 6 illustrates an example in which the module includes first and second stereo cameras 116A, 116B as the image capture devices, as well as a pattern projector 122. The stereo camera 116A, 116B are separated from one another by a known distance and are arranged so that their respective fields of view (FOV1, FOV2) substantially overlap. The cameras 116A, 116B in this example are sensitive to ambient light (i.e., RGB light in the visible part of the spectrum) as well as light at a wavelength (e.g., IR) generated by the projector 122. Thus, the cameras 116A, 116B can sense ambient as well as IR light reflected by the scene 112. In this scenario, sequential images are captured by the imagers 116A, 116B while the projector 122 is on and then off (or off and then on). In particular, images captured by both stereo cameras 116A, 116B while the projector is on (i.e., projecting a pattern onto the scene 112) are provided to the matching engine 124, which implements a block-matching or other stereo matching algorithm and generates an initial disparity map. In addition, an image captured by at least one of the cameras 116A or 116B while the projector 122 is off (i.e., not projecting a pattern onto the scene 112)

is provided to the segmentation engine 130. This implementation can be useful for static scenes. In such a stereo-image system, the updated distance value map generated by the engine 138 can take the form of a disparity map indicating the disparity values for the image elements (e.g., pixels).

Figure 7:
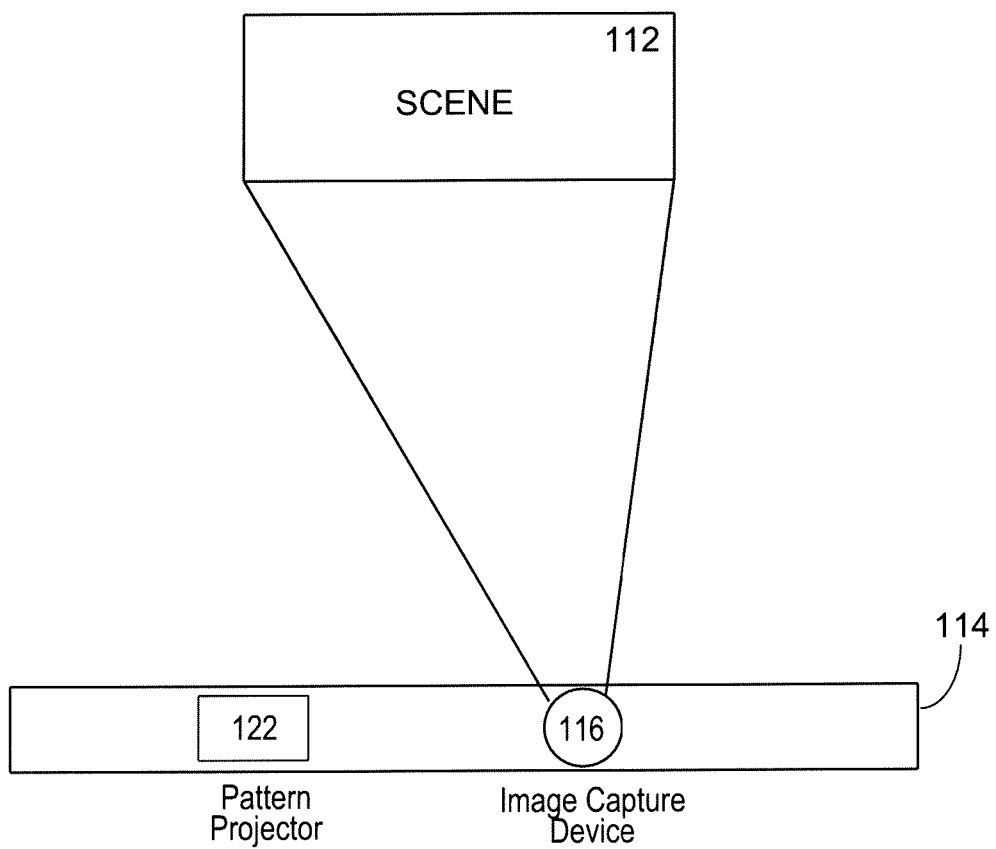

FIG. 7 illustrates an example in which the module may include only a single camera 116 as the image capture device, as well as a pattern projector 122. The camera 116 in this example is sensitive to ambient light (i.e., RGB light in the visible part of the spectrum) as well as light at a wavelength (e.g., IR) generated by the projector 122. Thus, the camera 116 can sense ambient as well as IR light reflected by the scene 112. In this scenario, sequential images are captured by the imager 116 while the projector 122 is on and then off (or off and then on). In particular, a depth image captured by the camera 116 while the projector is on (i.e., projecting an IR pattern onto the scene 112) is provided to the matching engine 124, which implements, for example, a code-word matching algorithm and generates a distance map. In addition, an image captured by the camera 116 while the projector 122 is off (i.e., not projecting the IR pattern onto the scene 112) is provided to the segmentation engine 130, which generates the segmentation map. This implementation also can be useful for static scenes. As described above, the engine 138 generates an updated distance map indicating the distance values for the image elements (e.g., pixels).

Figure 8:
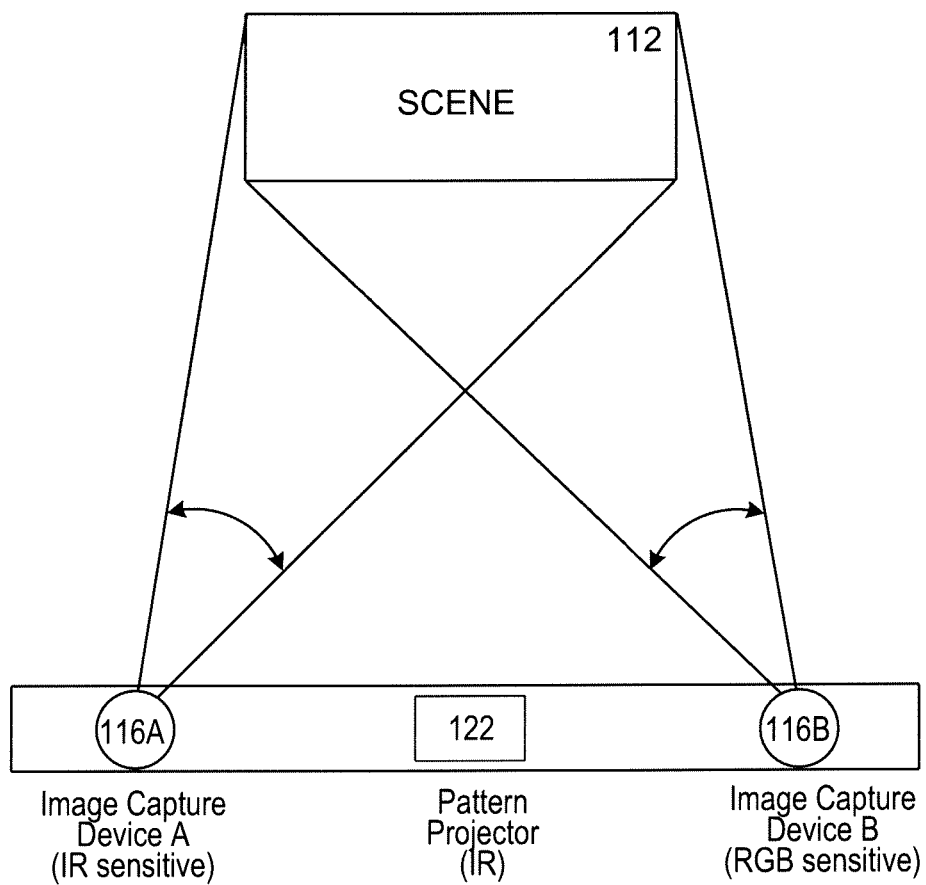

FIG. 8 illustrates an example in which the module first and second cameras 116A, 116B as the image capture devices, as well as a pattern projector 122. One of the cameras 116A in this example is only sensitive to light at a wavelength (e.g., IR) generated by the projector 122, but not to RGB light in the visible part of the spectrum. In contrast, the second camera 116B is only sensitive to ambient light (i.e., RGB light in the visible part of the spectrum), but not to IR. Thus, the first camera 116A only senses IR light reflected by the scene 112, whereas the second camera 116B only senses ambient light reflected by the scene 112 in the visible part of the spectrum. In this scenario, images can be captured by both imagers 116A, 116B at the same time while the projector 122 is on. Thus, sequential imaging is not required (although it may be used here as well). In particular, a depth image captured by the first camera 116A while the projector is on (i.e., projecting an IR pattern onto the scene 112) is provided to the matching engine 124, which implements, for example, a code-word matching algorithm and generates an initial distance map. In addition, an image captured by the second camera 116B while the projector 122 is on (i.e., projecting the IR pattern onto the scene 112) is provided to the segmentation engine 130, which generates the segmentation map. Since the second camera 116B is not sensitive to IR radiation, it is not sensitive to the IR pattern projected by the projector 122 onto the scene 112. As described above, the engine 138 generates an updated distance map indicating the distance values for the image elements (e.g., pixels).

Figure 9:
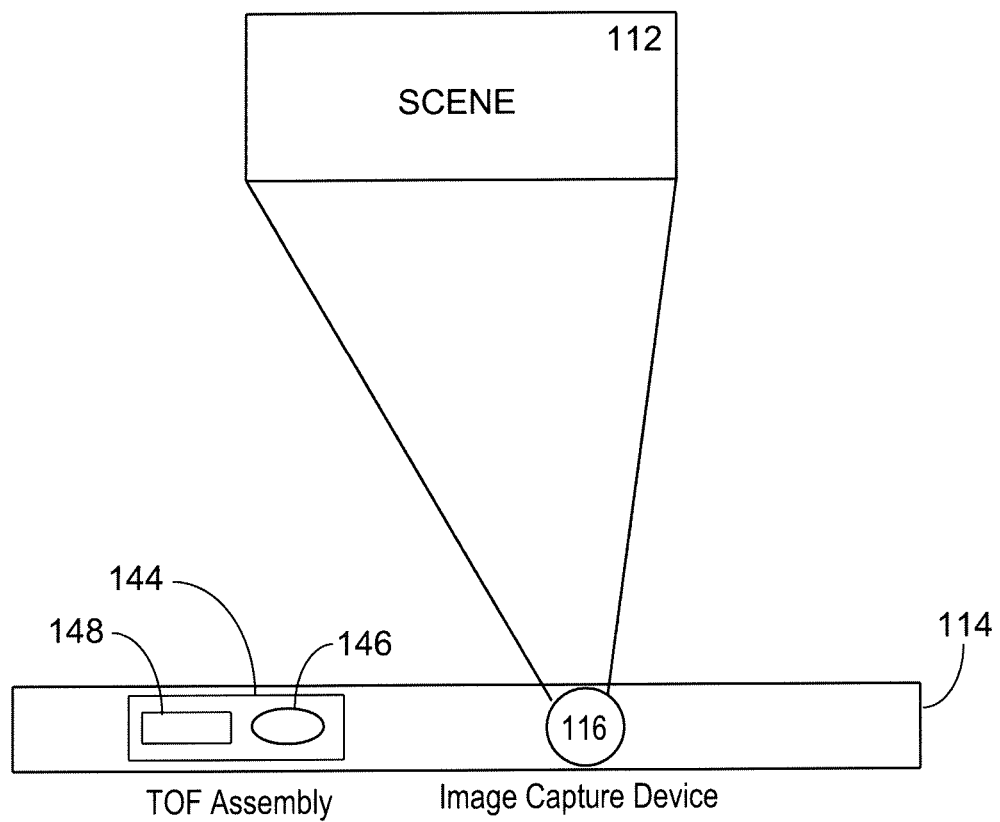

FIG. 9 illustrates an example in which the module includes a first imager 116 (e.g., a high resolution image sensor) and a time of flight (TOF) assembly 144. The TOF assembly 144 includes a dedicated (e.g., modulated) light source 146 to project light onto the object, and an array of pixels (e.g., demodulation pixels) 148. Preferably, the first imager 116 is not sensitive to wavelength(s) of light (e.g., IR) emitted by the TOF light source 146, but instead is sensitive to RGB light in the visible part of the spectrum. In some instances, the TOF assembly 144 can have relatively low resolution. TOF-based systems can provide depth and/or distance information and can be based, for example, on the phase-measurement technique of emitted intensity-modulated light, which is reflected by one or more objects. The reflected light is imaged onto a sensor, and the photo-generated electrons are demodulated in the sensor. Based on the phase information, the distance to a point in the scene for each pixel is determined by processing circuitry associated with the sensor. A depth map, which in some cases may be relatively sparse, can thus be generated. An image captured by the first imager 116 also can be provided to the segmentation engine 130, which generates the segmentation map. The engine 138 generates an updated depth map indicating the depth values for the image elements (e.g., pixels).

The techniques described here may be suitable, in some cases, for real-time applications in which the output of a computer process (i.e., rendering) is presented to the user such that the user observes no appreciable delays that are due to computer processing limitations. For example, the techniques may be suitable for real-time applications on the order of about at least 30 frames per second or near real-time applications on the order of about at least 5 frames per second.

In some implementations, the disparity map can be used as input for distance determination. For example, in the context of the automotive industry, the disparity map can be used in conjunction with image recognition techniques that identify and/or distinguish between different types of objects (e.g., a person, animal, or other object) appearing in the path of the vehicle. The nature of the object (as determined by the image recognition) and its distance from the vehicle (as indicated by the disparity map) may be used by the vehicle's operating system to generate an audible or visual alert to the driver, for example, of an object, animal or pedestrian in the path of the vehicle. In some cases, the vehicle's operating system can decelerate the vehicle automatically to avoid a collision.

The techniques described here also can be used advantageously for gesture recognition applications. For example, the disparity map generated using the present techniques can enhance the ability of the module or mobile device to distinguish between different digits (i.e., fingers) of a person's hand. This can facilitate the use of gestures that are distinguished from one another based, for example, on the number of fingers (e.g., one, two or three) extended. Thus, a gesture using only a single extended finger could be recognized as a first type of gesture that triggers a first action by the mobile device, whereas a gesture using two extended fingers could be recognized as a second type of gesture that triggers a different second action by the mobile device. Similarly, a gesture using only three extended finger could be recognized as a third type of gesture that triggers a different third action by the mobile device Various implementations described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various modifications and combinations of the foregoing features will be readily apparent from the present description and are within the spirit of the invention. Accordingly, other implementations are within the scope of the claims.

What is claimed is:

1. A method of generating a distance map of a scene, the method comprising:
    acquiring images of the scene using a plurality of stereo image sensors;
    generating a distance map, based on the acquired images, wherein a respective initial distance value is assigned for at least some individual image elements, wherein generating a distance map includes applying a matching algorithm using a first image from a first one of the stereo image sensors and a second image from a second one of the stereo image sensors;
    applying a segmentation algorithm to at least one of the first or second images to generate a segmentation map in which image elements are divided into a plurality of segments;
    assigning a respective distance value to each of the segments, wherein the distance value assigned to each particular segment is derived based on the initial distance values assigned to individual image elements associated with the particular segment;
    assigning to each of the image elements a respective updated distance value, wherein the updated distance value assigned to each particular image element is the same as the distance value assigned to the particular segment of which the particular image element is a part; and
    displaying on a display device a distance map of the scene, wherein the distance map indicates the respective updated distance values for the image elements using color-coding, wherein each color represents a different respective distance.

2. The method of claim 1 wherein the segmentation algorithm identifies regions of an image, where image elements in each respective region have the same or similar color or grey-scale value and wherein each region identified by the segmentation algorithm defines a contiguous group of image elements.

3. The method of claim 1 wherein the segmentation algorithm generates a segmentation map in which each particular image element is assigned a segment label based on the segment that it is associated with the particular image element.

4. A method of generating a distance map of a scene, the method comprising:
    acquiring a first image of the scene using a first stereo image sensor and acquiring a second image of the scene using a second stereo image sensor;
    generating a distance map, based on the acquired images, wherein a respective initial distance value is assigned for at least some individual image elements, wherein generating a distance map includes applying a matching algorithm to the acquired images, wherein applying the matching algorithm includes using the first and second images;
    acquiring a third image of the scene using a third image sensor;
    applying a segmentation algorithm to at least one of the acquired images to generate a segmentation map in which image elements are divided into a plurality of segments, wherein applying the segmentation algorithm includes using the third image;
    assigning a respective distance value to each of the segments, wherein the distance value assigned to each particular segment is derived based on the initial distance values assigned to individual image elements associated with the particular segment;
    assigning to each of the image elements a respective updated distance value, wherein the updated distance value assigned to each particular image element is the same as the distance value assigned to the particular segment of which the particular image element is a part; and
    displaying on a display device a distance map of the scene, wherein the distance map indicates the respective updated distance values for the image elements using color-coding, wherein each color represents a different respective distance.

5. A method of generating a distance map of a scene, the method comprising:
    projecting an infra-red pattern onto the scene;
    acquiring a first image of the scene using a first stereo image sensor while the infra-red pattern is projected onto the scene, and acquiring a second image of the scene using a second stereo image sensor while the infra-red pattern is projected onto the scene, wherein the first and second stereo image sensors are sensitive to infra-red radiation and to light in the visible part of the spectrum;
    generating a distance map, based on the acquired images, wherein a respective initial distance value is assigned for at least some individual image elements, wherein generating a distance map includes applying a matching algorithm to the acquired images, wherein applying the matching algorithm includes using the first and second images;
    acquiring a third image of the scene using either the first or second stereo image sensor while the infra-red pattern is not projected onto the scene;
    applying a segmentation algorithm to at least one of the acquired images to generate a segmentation map in which image elements are divided into a plurality of segments, wherein applying the segmentation algorithm includes using the third image;
    assigning a respective distance value to each of the segments, wherein the distance value assigned to each particular segment is derived based on the initial distance values assigned to individual image elements associated with the particular segment;
    assigning to each of the image elements a respective updated distance value, wherein the updated distance value assigned to each particular image element is the same as the distance value assigned to the particular segment of which the particular image element is a part; and
    displaying on a display device a distance map of the scene, wherein the distance map indicates the respective updated distance values for the image elements using color-coding, wherein each color represents a different respective distance.

6. A method of generating a distance map of a scene, the method comprising:
   projecting an infra-red pattern onto the scene;
   acquiring a first image of the scene using a first image sensor while the infra-red pattern is projected onto the scene, wherein the first image sensor is sensitive to infra-red radiation and to light in the visible part of the spectrum;
   acquiring a second image of the scene using the first image sensor while the infra-red pattern is not projected onto the scene;
   generating a distance map, based on the acquired images, wherein a respective initial distance value is assigned for at least some individual image elements, wherein generating a distance map includes applying a matching algorithm using the first image;
   applying a segmentation algorithm to at least one of the acquired images to generate a segmentation map in which image elements are divided into a plurality of segments, wherein applying the segmentation algorithm includes using the second image;
   assigning a respective distance value to each of the segments, wherein the distance value assigned to each particular segment is derived based on the initial distance values assigned to individual image elements associated with the particular segment;
   assigning to each of the image elements a respective updated distance value, wherein the updated distance value assigned to each particular image element is the same as the distance value assigned to the particular segment of which the particular image element is a part; and
   displaying on a display device a distance map of the scene, wherein the distance map indicates the respective updated distance values for the image elements using color-coding, wherein each color represents a different respective distance.

7. An apparatus for generating a distance map of a scene, the apparatus comprising:
   an infra-red projector to project an infra-red pattern onto the scene;
   a plurality of stereo image sensors, wherein a first one of the stereo image sensors is controlled to acquire a first image of the scene while the infra-red pattern is projected onto the scene, and wherein a second one of the stereo image sensors is controlled to acquire a second image of the scene while the infra-red pattern is projected onto the scene, wherein the first and second stereo image sensors are sensitive to infra-red radiation;
   a third image sensor;
   a first engine comprising one or more processors configured to generate a distance map in which a respective initial distance value is assigned for at least some individual image elements, the first engine operable to generate the distance map by applying a matching algorithm to the first and second images;
   a segmentation engine comprising one or more processors configured to apply a segmentation algorithm to a third image acquired by the third image sensor so as to generate a segmentation map in which image elements are divided into a plurality of segments;
   a distance value assignment engine comprising one or more processors configured to:
   assign a respective distance value to each of the segments, wherein the distance value assigned to each particular segment is derived based on the initial distance values assigned to individual image elements associated with the particular segment; and
   assign to each of the image elements a respective updated distance value, wherein the updated distance value assigned to each particular image element is the same as the distance value assigned to the particular segment of which the particular image element is a part; and
   a display device operable to display a distance map of the scene, wherein the distance map indicates the respective updated distance values for the image elements.

8. The apparatus of claim 7 wherein:
   the segmentation engine is configured to identify regions of an image, where image elements in each respective region have the same or similar color or grey-scale value and wherein each region identified by the segmentation engine defines a contiguous group of image elements,
   wherein the segmentation engine further is configured to generate a segmentation map in which each particular image element is assigned a segment label based on the segment that it is associated with the particular image element, and
   wherein the distance value assignment engine is configured to assign a respective average value to each particular segment, wherein the average value for each particular segment is an average of most or all of the initial distance values assigned to individual image elements associated with the particular segment.

9. An apparatus for generating a distance map of a scene, the apparatus comprising:
   an infra-red projector to project an infra-red pattern onto the scene; and
   a plurality of stereo images sensors that are sensitive to infra-red radiation and to light in the visible part of the spectrum, wherein a first one of the stereo image sensors is controlled to acquire a first image of the scene while the infra-red pattern is projected onto the scene, and wherein a second one of the stereo image sensors is controlled to acquire a second image of the scene while the infra-red pattern is projected onto the scene;
   a first engine comprising one or more processors configured to generate a distance map in which a respective initial distance value is assigned for at least some individual image elements, the first engine operable to generate the distance map by applying a matching algorithm to the acquired images, wherein the first engine is configured to apply the matching algorithm to the first and second images to generate an initial distance map;
   a segmentation engine comprising one or more processors configured to apply a segmentation algorithm to at least one of the acquired images and to generate a segmentation map in which image elements are divided into a plurality of segments, wherein at least one of the first or second stereo image sensors is controlled to acquire a third image of the scene while the infra-red pattern is not projected onto the scene; and wherein the segmentation engine is configured to apply the segmentation algorithm using the third image to generate the segmentation map; and
   a distance value assignment engine comprising one or more processors configured to:

assign a respective distance value to each of the segments, wherein the distance value assigned to each particular segment is derived based on the initial distance values assigned to individual image elements associated with the particular segment; and assign to each of the image elements a respective updated distance value, wherein the updated distance value assigned to each particular image element is the same as the distance value assigned to the particular segment of which the particular image element is a part;

the apparatus further including a display device operable to display a distance map of the scene, wherein the distance map indicates the respective updated distance values for the image elements.

10. An apparatus for generating a distance map of a scene, the apparatus comprising:

an infra-red projector to project an infra-red pattern onto the scene; and a first image sensor that is sensitive to infra-red radiation and to light in the visible part of the spectrum, wherein the first image sensor is controlled to acquire a first image of the scene while the infra-red pattern is projected onto the scene and to acquire a second image of the scene using the first image sensor while the infra-red pattern is not projected onto the scene;

a first engine comprising one or more processors configured to generate a distance map in which a respective initial distance value is assigned for at least some individual image elements, the first engine operable to generate the distance map by applying a matching algorithm to the acquired images, wherein the first engine is configured to apply the matching algorithm using the first image to generate an initial distance map;

a segmentation engine comprising one or more processors configured to apply a segmentation algorithm to at least one of the acquired images and to generate a segmentation map in which image elements are divided into a plurality of segments, wherein the segmentation engine is configured to apply the segmentation algorithm using the second image to generate the segmentation map; and a distance value assignment engine comprising one or more processors configured to:

assign a respective distance value to each of the segments, wherein the distance value assigned to each particular segment is derived based on the initial distance values assigned to individual image elements associated with the particular segment; and assign to each of the image elements a respective updated distance value, wherein the updated distance value assigned to each particular image element is the same as the distance value assigned to the particular segment of which the particular image element is a part;

the apparatus further including a display device operable to display a distance map of the scene, wherein the distance map indicates the respective updated distance values for the image elements.

11. An apparatus for generating a distance map of a scene, the apparatus comprising:

an infra-red projector to project an infra-red pattern onto the scene; and a plurality of image sensors, wherein a first one of the image sensors is sensitive to infra-red radiation, but not to light in the visible part of the spectrum, and wherein a second one of the image sensors is sensitive to light in the visible part of the spectrum, but not to the infra-red radiation, wherein the first and second image sensors are controlled to acquire, respectively, a first image of the scene and a second image of the scene while the infra-red pattern is projected onto the scene;

a first engine comprising one or more processors configured to generate a distance map in which a respective initial distance value is assigned for at least some individual image elements, the first engine operable to generate the distance map by applying a matching algorithm to the acquired images, wherein the first engine is configured to apply the matching algorithm using the first image to generate an initial distance map;

a segmentation engine comprising one or more processors configured to apply a segmentation algorithm to at least one of the acquired images and to generate a segmentation map in which image elements are divided into a plurality of segments, wherein the segmentation engine is configured to apply the segmentation algorithm using the second image to generate the segmentation map; and a distance value assignment engine comprising one or more processors configured to:

assign a respective distance value to each of the segments, wherein the distance value assigned to each particular segment is derived based on the initial distance values assigned to individual image elements associated with the particular segment; and assign to each of the image elements a respective updated distance value, wherein the updated distance value assigned to each particular image element is the same as the distance value assigned to the particular segment of which the particular image element is a part;

the apparatus further including a display device operable to display a distance map of the scene, wherein the distance map indicates the respective updated distance values for the image elements.

* * * * *

UNITED STATES PATENT AND TRADEMARK OFFICE
CERTIFICATE OF CORRECTION

PATENT NO. : 10,510,149 B2
APPLICATION NO. : 15/743948
DATED : December 17, 2019
INVENTOR(S) : Cutu et al.

Page 1 of 1

It is certified that error appears in the above-identified patent and that said Letters Patent is hereby corrected as shown below:

In the Specification

Column 1, Line 9: replace "Aug. 3, 2015" with --Jul. 17, 2015--

Signed and Sealed this
Ninth Day of June, 2020

Andrei Iancu
*Director of the United States Patent and Trademark Office*